United States Patent
Keyes

(10) Patent No.: US 7,032,621 B2
(45) Date of Patent: Apr. 25, 2006

(54) HIGH TEMPERATURE LINE EXPANSION INSTALLATION WITH RELEASE AGENT

(75) Inventor: Thomas Joseph Keyes, Fort Worth, TX (US)

(73) Assignee: Thermacor Process, LP, Fort Worth, TX (US)

( * ) Notice: Subject to any disclaimer, the term of this patent is extended or adjusted under 35 U.S.C. 154(b) by 30 days.

(21) Appl. No.: 10/945,175

(22) Filed: Sep. 20, 2004

(65) Prior Publication Data

US 2006/0060256 A1    Mar. 23, 2006

(51) Int. Cl.
*F16L 9/22*    (2006.01)

(52) U.S. Cl. .................. 138/120; 138/149; 138/155; 138/118; 138/145; 285/45; 285/228; 285/299

(58) Field of Classification Search ........... 138/118, 138/149, 114, 145, 146, 155, 120; 285/45, 285/299, 301, 302, 226, 228
See application file for complete search history.

(56) References Cited

U.S. PATENT DOCUMENTS

| | | | |
|---|---|---|---|
| 2,903,018 A * | 9/1959 | Goff .......................... 138/140 |
| 3,359,016 A | 12/1967 | Sarlls ......................... 285/228 |
| 3,642,034 A * | 2/1972 | Ullman et al. .............. 138/144 |
| 3,766,357 A * | 10/1973 | Koester, Jr. ................. 392/478 |
| 3,793,411 A * | 2/1974 | Stonitsch et al. ........... 264/46.5 |
| 3,837,685 A | 9/1974 | Miller ......................... 285/45 |
| 3,865,145 A * | 2/1975 | McKay et al. .............. 138/113 |
| 3,865,662 A * | 2/1975 | Segal .......................... 156/94 |
| 3,885,595 A * | 5/1975 | Gibson et al. .............. 138/155 |
| 4,084,842 A * | 4/1978 | Stonitsch et al. ............ 285/47 |
| 4,221,405 A * | 9/1980 | Stonitsch et al. ............ 285/53 |
| 4,239,267 A | 12/1980 | Hudson ...................... 285/228 |
| 4,350,372 A | 9/1982 | Logsdon ..................... 285/45 |
| 4,484,386 A | 11/1984 | Stonitsch .................... 29/455 |
| 5,058,934 A | 10/1991 | Brannon ..................... 285/226 |
| 5,072,591 A * | 12/1991 | Grange et al. .............. 62/50.7 |
| 6,527,015 B1 * | 3/2003 | Lively ......................... 138/149 |
| 6,910,506 B1 * | 6/2005 | Gabriel et al. .............. 138/114 |

* cited by examiner

*Primary Examiner*—Patrick Brinson
(74) *Attorney, Agent, or Firm*—Charles D. Gunter, Jr.

(57) ABSTRACT

A high temperature pre-insulated piping system is shown which can withstand conveyance temperatures in excess of 250° F. The piping system includes a first and second length of insulated and jacketed pipe. Each pipe length includes an inner metal pipe having an interior surface and an exterior surface and having an envelope of foamed insulation surrounding the inner pipe exterior surface. A special release agent is applied between the metal pipe exterior and the surrounding layer of foamed insulation. The release agent causes intentional disbondment of the foamed insulation layer from the inner metal pipes under certain conditions of environmental stress.

17 Claims, 4 Drawing Sheets

HIGH TEMPERATURE LINE EXPANSION INSTALLATION WITH RELEASE AGENT

BACKGROUND OF THE INVENTION

1. Field of the Invention

The present invention relates to pre-insulated piping systems, and more specifically to a method for anticipating and selectively controlling the disbondment of the foam from the carrier pipe which may occur as these systems thermally expand in the presence of high temperature fluids being conveyed.

2. Description of the Prior Art

There are many instances in which insulated pipelines are needed. For example, distributed HVAC (heating, ventilation and air conditioning) applications utilize chilled water for cooling and steam for heating. The chiller and boiler are typically contained in a central location and the chilled water and steam are distributed to other locations. For example, on a school campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Insulated pipe is conventional and commercially available. There are predominately two types of piping systems in use: Class-A drainable dryable testable (DDT); and polyurethane or polyisocyanurate "bonded" foam systems. Both of these systems use an inner carrier pipe to convey fluid. Although steel is commonly used for the inner pipe which carries the media to be piped, copper or aluminum or other metals as well as fiberglass, PVC, and similar materials may be utilized, as well. The present application is directed toward the "bonded" foam type system. These systems utilize a steel pipe to convey fluid. Around the outside of the steel pipe is a layer of insulating foam such as, for example, polyisocyanurate foam. Around the outside of the foam is a jacket of hard thermoplastic (such as high density polyethylene, HDPE). The foam has set up or cured within the outer jacket so as to bond to the jacket and to the inner pipe. The plastic jacket protects the foam from mechanical damage and also provides a water tight seal to prevent corrosion of the steel pipe. In the bonded type system, the foam and outer jacket do not move relative to the inner pipe. In the Class-A type system, on the other hand, the insulated inner pipe is designed to move independently of the associated outer jacket. In fact, there is an air gap between the inner pipe and outer carrier pipe in the class-A type system.

The most important engineering criteria for the traditional "bonded" foam type system is that it must be treated as a monolithic system. In other words, the foam is bonded to both the carrier pipe and the outer jacket. Therefore, the bonded system has traditionally been designed to move as a unit underground. Higher temperatures can act adversely upon the bonded foam system, however. The hot fluid in the steel carrier pipe causes the carrier pipe to thermally expand. At temperatures of 400° F. this expansion is on the order of 2.8 inches per 100 feet of pipe. This expansion is not a problem as long as the system remains bonded and the carrier pipe, foam and jacket move together as one unit underground. This movement is controlled by the expansion force of the steel carrier pipe, but it is the bond strength of the foam to the pipe and jacket that is important in keeping the system moving together. This monolithic movement of the system occurs along each incremental length of a particular run, and as long as total movement is not greater than 4 to 6 inches and the system remains bonded, no undue stress is subjected at any one point of the jacket. If the system however were to disbond, the surrounding soil would fix the jacket in place and the carrier pipe would still thermally expand thereby pushing thorough and destroying the jacket at the first change of direction.

Generally speaking, the proper choice of insulating materials can counteract many of the thermal expansion effects discussed above. It has been well established by industry case history that the polyurethane foam bond for systems running at 250° to 300° is strong enough to keep the entire system acting as a bonded system. However, for systems running above these temperatures a higher temperature rated foam, such as polyisocyanurate foam, is required. However, even in systems utilizing "high temperature" polyiscyanurate foam, the higher heat can in some circumstances, begin to fry the foam at the foam/carrier pipe interface, thereby bringing into question the strength of the foam bond to the steel carrier pipe.

Despite the advances which have been made in addressing the above problems, a need exists for improvements in pre-insulated piping systems which will either ensure that the insulating foam remains bonded to the carrier pipe, or which will ensure that the foam bond fails in a predictable manner and at preselected locations.

A need exists for an alternative fo the traditional "bonded" foam system which can be utilized at temperatures exceeding 250° F. to 350° F. without risk of having the carrier pipe rupture the outer jacket at changes of direction.

A need continues to exist for a pre-insulated piping system of the above type which effectively either prevents or accommodates foam disbondment, even at temperatures above 250 to 300° F.

A need also exists for a complimentary mechanical expansion component for such systems which compliments the bonding system and which is activated in the case of movement of the inner steel carrier pipe relative to the foam insulation to prevent the carrier pipe foam pushing through the outer jacket or causing other structural damage to the system.

SUMMARY OF THE INVENTION

The present invention employs a different approach to the problem of disbondment in foam pre-insulated piping systems, which approach is, in a sense, a hybrid of the prior art approaches. The system under consideration is essentially an unbonded, high temperature isocyanurate system which, like the prior art Class-A systems is designed to allow the inner carrier pipe to move independently of the outer layers of insulation. However, unlike certain of the unbonded, prior art systems which allowed the intrusion of water and other contaminants, the present system acts more in the nature of the "bonded" foam systems as far as the overall integrity of the system since there is no air gap between the inner pipe and outer carrier pipe and since closed cell foams are used for the surrounding insulating layer.

The present invention has as its general purpose to provide a method for anticipating and selectively controlling the disbondment of the foam from the carrier pipe in a foam bonded pre-insulated piping system which may occur as these systems thermally expand in the presence of high temperature fluids being conveyed and which satisfies the previously described deficiencies.

This object is accomplished by providing an underground piping system capable of servicing temperatures in excess of 250° F. in which a metal carrier pipe is insulated by a high temperature foam. In some circumstances, the unit of piping will remain bonded so that it will move as a single monolithic unit underground. However, the unit of piping is also provided with a release agent as a part of the insulation profile which will ensure that the foam bond fails in a predictable manner and at preselected locations under conditions in which the foam bond would normally fail in an unpredictable manner without the presence of the release agent.

In one embodiment, a first and second length of insulated and jacketed pipe are provided, each having a joining end to be joined to an end of the other length. Each of the pipe lengths comprises an inner metal pipe having an interior surface and an exterior surface. A special release agent is first applied to the exterior surface of the inner metal pipe, as by spraying or wrapping the pipe with a thin layer of the release agent. An envelope of foamed insulation is then applied so that it surrounds the inner pipe exterior surface. An outer protective HDPE jacket surrounds the envelope of insulation.

In one embodiment of the invention, the layer of release agent bonds to both the exterior of the inner pipe and to the surrounding foam insulation. In another embodiment of the invention, the release agent forms a very thin layer or coating on the pipe exterior so that, even without bonding, the envelope of insulation is initially restrained, but later fails in a controlled manner under predetermined conditions of environmental stress. The release agent can comprise, for example, a very thin layer of polyethylene which becomes viscous or liquid at higher temperatures. The joining ends of adjacent pipe lengths are afixed, as by being welded together, to form fixed joints, whereby the adjacent pipe lengths provide a continuous fluid conduit for conveying high temperature fluids.

A mechanical expansion component may also be utilized as a part of the high temperature line installation. In some circumstances, the expansion component is simply an elbow or loop provided in the line installation. In another embodiment of the invention, a tubular bellows surrounds the joining ends of the inner pipes and the layer of previously applied high temperature insulation. The bellows is capable of being axially expanded and contracted and of being configured in a straight or curved axial configuration. The tubular bellows has opposing outer extents which are joined to the foamed insulation surrounding the respective pipe lengths being coupled. The release agent is selectively applied to the metal pipe exterior so that any disbondment which occurs will occur at a predetermined location which can be accommodated by the presence of the bellows or expansion joint.

Any of the bonded foam type pre-insulated piping systems may benefit from the techniques of the present invention. However, those systems in which fluid temperatures in excess of 250° F. are likely to be encountered are perhaps best suited for the practice of the present invention. It is these systems which generally require higher temperature foams and which also bring into question the strength of the foam bond.

Additional objects, features and advantages will be apparent in the written description which follows.

DETAILED DESCRIPTION OF THE INVENTION

Figure 1:
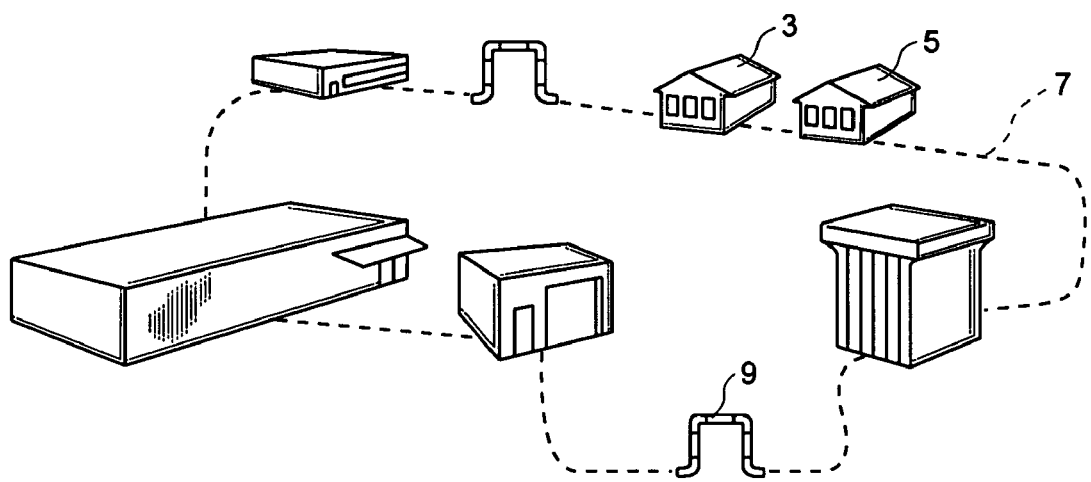
FIG. 1 is a simplified representation of a typical distributed HVAC system utilizing chilled water for cooling and steam for heating.
Figure 2:
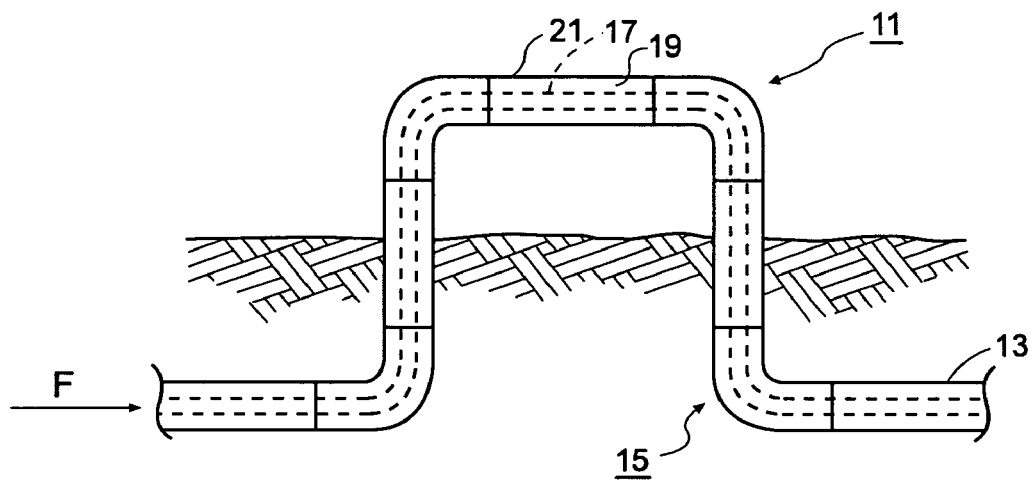
FIG. 2 is a schematic representation of an expansion loop in a pre-insulated pipeline prior to thermal expansion.
Figure 3:
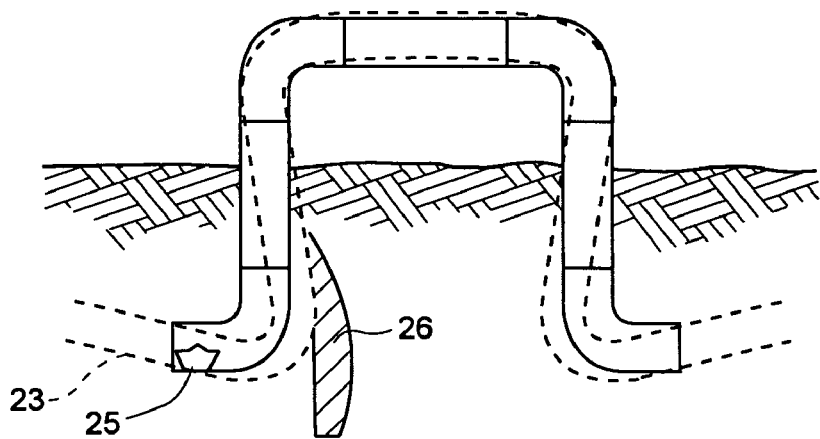
FIG. 3 is a schematic view of the pipeline of FIG. 2 under the influence of thermal expansion forces.
Figure 4:
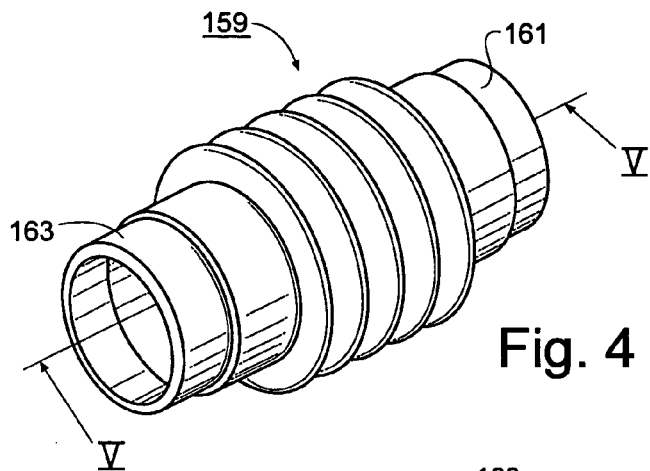
FIG. 4 is an isolated view of the bellows used in forming the flexible coupling of the invention.
Figure 5:
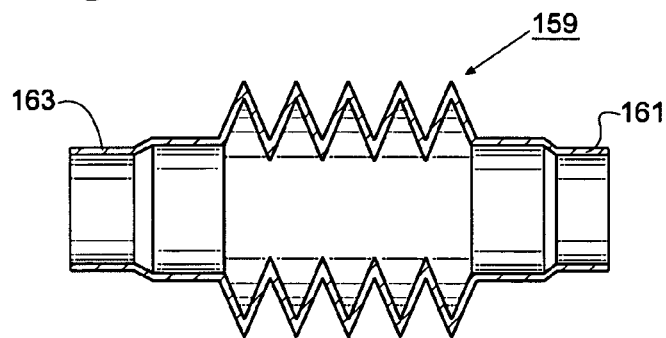
FIG. 5 is a side, cross-sectional view of the bellows taken along line V—V in FIG. 4.

Turning first to FIGS. 1–3, there is illustrated a typical environment in which the pre-insulated piping systems of the invention might be employed. FIG. 1 shows a school campus having a number of isolated buildings 3, 5 connected by an underground insulated pipeline carrying steam which at points includes right angle loops or elbows 9.

FIGS. 2 and 3 are schematic views of the standard piping installation of the type under consideration designated generally as 11. The installation 11 includes a number of coaxially oriented lengths of pipe, such as length 13 (shown broken away in FIG. 2). The installation may also include a number of angled fittings such as the right angle elbows (generally shown as 15) in FIG. 2. Each length of pipe includes an inner pipe 17, typically formed of steel, an envelope of foamed insulation 19 surrounding the inner pipe and outer protective jacket 21 surrounding the envelope of insulation. The joining ends (shown generally as 135, 137 in FIG. 7) of adjacent pipe lengths are afixed, as by being welded together, to form fixed joints, whereby the adjacent pipe lengths provide a continuous fluid conduit for conveying high temperature fluids. The jacket 21 (FIG. 1) is typically formed of high density polyethylene (HDPE) or a similar polyolefin type material. The following references, among others, teach the manufacture of such prior art systems: U.S. Pat. No. 3,793,411; U.S. Pat. No. 4,084,842; and U.S. Pat. No. 4,221,405, all to Stonitsch et al.

The piping systems of the type illustrated in FIGS. 2 and 3 are sometimes utilized to convey fluids at high temperature and/or pressures. For example, a typical steam line might be conveying fluid at, for example, 400° F. The temperature differentials which exists between the piping system materials and the fluid being conveyed can cause a force ("F" in FIG. 2) to be applied along the coaxially aligned pipes lengths. If the carrier is free to move independently from the foam and jacket (disbondment has occurred) then the surrounding soil will fix the jacket in place and the carrier pipe will burst through the foam and jacket in areas shown generally as 15 and 13 in FIG. 2.

In the piping system illustrated in FIG. 3, the system is displacing as a unit and moves into both a cushioned bolster padding 26 and the surrounding soil 28. This movement does not damage the jacketing or the foam of the system because they are both incrementally being pulled along throughout the entire length of the straight run. Because of this monolithic movement no one individual section of the jacket is over stressed and thereby ruptured, and no one individual section of the foam is required to support the entire force of the thermal expansion of the pipe. The bond distributes these forces along each incremental length of the entire run. It will be understood, however, that should the forces become great enough, disbondment of the foam from the carrier pipe can occur. In such case, the foam and outer jacket can be ruptured, as illustrated generally at 25 in FIG. 3. Failure of the surrounding insulated layers allows water or other contaminants to contact the steel pipe, leading to increased corrosion and joint failure in some cases.

The present invention is directed toward an expansion installation for high temperature insulated piping systems of the type illustrated generally in FIGS. 1–3. The present invention is intended to provide a solution for possible disbondment problems for foam bonded piping systems that are operating at temperatures in the range of 250° F. and above 250° F. At temperatures that begin to exceed 250° F., foams have been developed that are stable structurally to handle these higher temperature, but the bond strength of the foams at these temperatures may come into question. The invention is intended to prevent the potential problems that might occur if the foam bond strength is not sufficient to cause the system to expand as one monolithic item.

The reference in this discussion to pipe "lengths" is intended to refer to standard available factory pre-insulated piping of the type previously described having an inner metal pipe surrounded by an envelope of foamed insulation, which in turn, is contained within a polyolefin jacket. As referred to briefly above, typical commercial practice involves the use of steel, copper, aluminum or alloy conveying pipes, open or closed cell polyurethane, polyisocyanurate, polystyrene or the like, foamed rigid insulation and polypropylene, polybutylene, polyethylene, polyvinylchloride and similar protective jackets.

The term "high temperature", as used in this discussion, will be any temperature exceeding 250° F., which is the present temperature limitation at which polyurethane foam is used in bonded foam systems. Temperatures above 250° F. require the use of higher temperature foams, such as polyisocyanurate foam, whose bond strength may come into question.

The present invention is an improvement to presently available pre-insulated piping of the type which is commercially available and familiar to those in the relevant industries. Prior art pipe lengths of this general type are commercially available as standard factory type product. For example, such product is available from Thermacor Process, LP of Fort Worth, Tex., assignee of the present invention. One typical example is sold commercially as the HT-406 High Temp Steel Piping System. The published specifications for systems are as follows:

| Carrier Pipe- | |
|---|---|
| diameter less than about 2" | A53 ERW Grade B, Std. Wt. Black Steel |
| diameter greater than about 2" | A106 SML, Std. Wt. Black Steel |
| HDPE Jacket- | |
| Compatible with ASTM D3350 | |
| Specific Gravity (ASTM D792) | 0.941 min. |
| Tensile Strength (ASTM D638) | 3100 psi min. |
| Elongation Ultimate (ASTM D638) | 400% min. |
| Compressive Strength (ASTM D695) | 2700 psi min. |
| Impact Strength (ASTM D256) | 2.0 ft. lb/in. North Min. |
| Rockwell Hardness (ASTM D785) | D60 (Shore) min. |
| Polyisocyanurate Insulation- | |
| Density | >2.4 lbs/ft$^3$ |
| "K" Factor | ≦0.14 @ 70° F., ≦0.24 @ 406° F. |
| Compressive Strength | >30 psi |
| Closed Cell Content | ≧90% |
| Minimum Thickness | ≧2.5" @ 366° F., ≧3.0" @ 406° F. |

The present invention preferably incorporates an expansion component to accommodate movement of the inner pipe relative to the outer jacket and insulation. The expansion component may be as simple as a loop or elbow in the piping, as previously described. In one aspect, the present invention incorporates a mechanical expansion joint, or bellows, to accommodate line expansion forces. Such a preferred expansion joint is described in our co-pending patent application, entitled "HIGH TEMPERATURE LINE EXPANSION INSTALLATION WITH BELLOWS", serial no. 09/748,058, filed concurrently herewith. The present invention also concerns the additional discovery that many of the problems associated with disbondment of the prior art systems, such as those described above, can be overcome by applying a special release agent to the exterior surface of the inner metal pipes prior to applying the insulating foam layer. An envelope of foamed insulation can then be applied over the thermally protective coating. The release agent may bond to both the exterior surface of the inner metal pipe and to the surrounding foamed insulation at an interface layer. Alternatively, the release agent may be sufficiently thin to initially restrain the foam outer layer, but to then allow relative movement in a controlled fashion in the presence of predetermined environmental stresses, such as increased temperature and consequent pipe expansion. In this situation, the system is, in effect, an unbonded high temperature isocyanurate system.

In one form, the special release agent is a polyethylene wrap which is on the order of 5 mil thick. A corona treated sheet of polyethylene can be applied to the exterior of the steel pipe using conventional processing equipment, as will be explained in the discussion which follows. The polyethylene has an upper temperature limit of approximately 255° F. before it begins to soften and become viscous. The polyethylene wrap will thus act as a release agent which designs a controlled failure aspect into the product once a given temperature is reached due to the hot fluid being conveyed within the inner carrier pipe. The advantage of having a controlled failure is that the exact point of failure can be predicted and further accommodated, as with a mechanical expansion joint, or other technique. Also, the failure occurs uniformly, with all of the insulation coming loose at one time in a predictable manner.

Other release agents can be utilized, as well. For example, other thermoplastic polyolefins such as polypropylene, or traditional non-stick coatings such as polytetrafluoroethylene (PTFE), also known as TEFLON® may be sprayed or wrapped about the exterior surface of the steel pipe. The preferred wraps or coatings are much thinner than the prior art composite systems, such as those incorporating a layer of PERLITE®, for added insulatory properties. The release agent forms a layer of a predetermined thickness on the exterior surface of the inner metal pipes, the thickness being in the range from about 2–50 mils. The preferred thin layer of release agent is less than about 40–50 mils thick preferably less than about 10 mils thick and, most preferably in the case of a polyethylene wrap, is on the order of about 5 mils thick.

Figure 10:
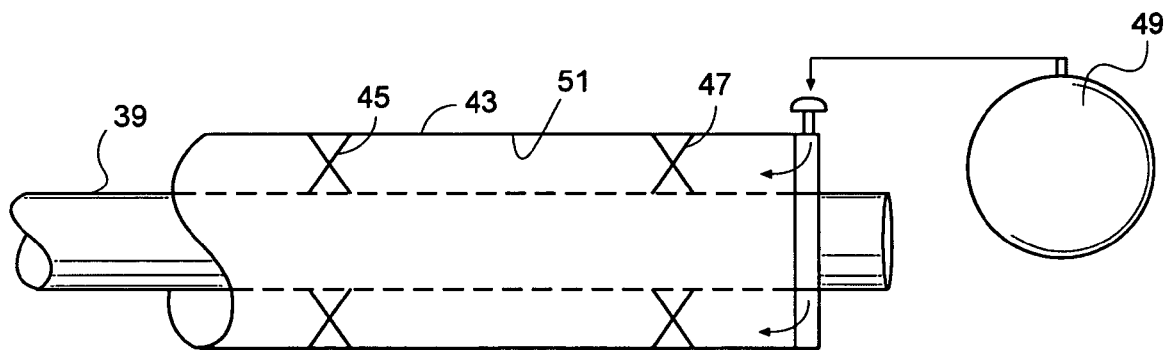
FIG. 10 is a simplified representation of the next step in the method of the invention in which a thermoplastic jacket is positioned about the inner metal pipe and a foam material is placed between the jacket and the exterior surface of the inner pipe.
Figure 11:
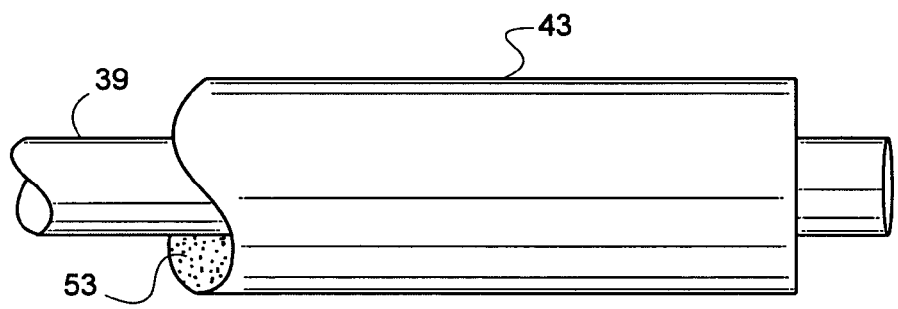
FIG. 11 is a view similar to FIG. 10 but showing the cured foam which normally bonds to both the inner carrier pipe and to the surrounding thermoplastic jacket.
Figure 12:
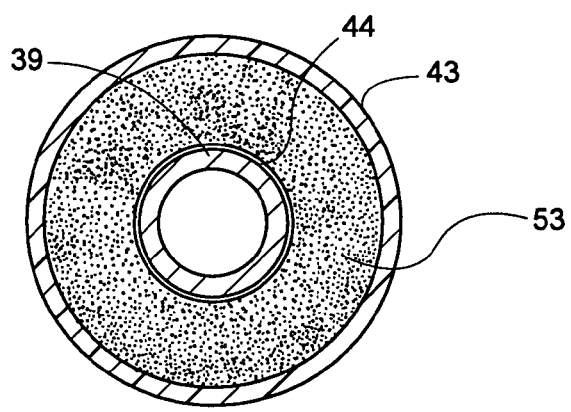
FIG. 12 is an end view, partly in section of the completed pre-insulated pipe of the invention and illustrating in exaggerated fashion the layer of release agent which separates the metal pipe exterior surface from the layer of surrounding cured foam.

Turning now to FIGS. 9–12, the various steps in the method of the invention are illustrated. An inner metal or carrier pipe 39 has the special release agent of the invention applied thereto. In FIG. 9A, the release agent takes the form of a 5 mil wrap of polyethylene which is dispensed from the dispenser head 41. In FIG. 9B, the release agent takes the form of a TEFLON® spray in which particles of adherent TEFLON® are dispensed by the directional spray nozzle 42. In the case of the polyethylene wrap, the layer of release agent is initially bonded to both the inner metal pipe and the outer layer of foam insulating material. In the case of the TEFLON® spray, the layer of release agent is not typically bonded to the metal of the pipe. In FIG. 10, the coated pipe 39 is surrounded by the outer thermoplastic jacket 43 which is positioned by means of standoffs 45, 47. A foam insulating material from a suitable supply source 49 is then pumped into the annular space 51 between the pipe exterior and the interior of the thermoplastic jacket and allowed to set (illustrated as 53 in FIG. 11). In the particular embodiment of the invention illustrated in FIG. 11, the surrounding foam insulation layer 53 is typically polyisocyanurate foam insulation for systems above 250° F. FIG. 12 shows the layer of release agent, in exaggerated fashion as 44. The surrounding jacket 43 is a polyolefin, preferably HDPE.

From the above discussion, it will be appreciated that the pre-insulated piping system of the invention shares certain of the desirable features of both the Class-A drainable dryable testable (DDT) systems and the polyurethane or polyisocyanurate "bonded" foam systems. Like the prior Class-A system, the present system intentionally anticipates and allows for movement of the inner carrier pipe relative to the outer stationary jacket. The action of the improved system in allowing the inner pipe to move independently alleviates stress in the outer polyethylene jacket. At the same time, the present system resembles the prior bonded systems in providing a sealed environment for the carrier pipe which resists the intrusion of water or other contaminants which could cause rust or corrosion.

The designed failure mode which results from employing a release agent in the manner previously described allows the controlled disbondment which occurs to be accommodated by a mechanical mechanism, such as a mechanical expansion joint or other failure compensating mechanism. FIGS. 4–8 illustrate one mechanical expansion system which can be utilized with the restraint system of the invention.

Figure 7:
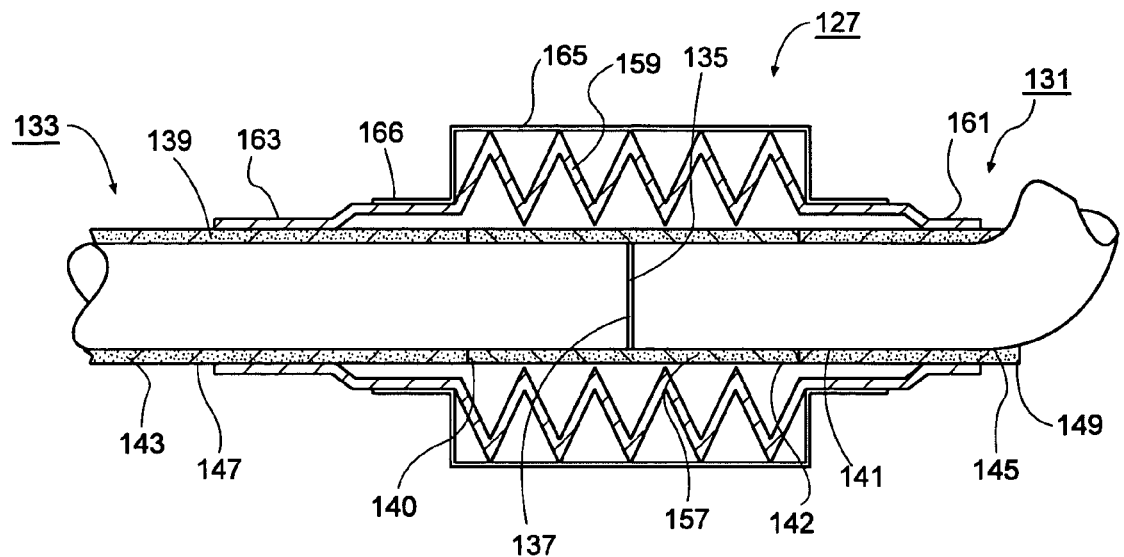
FIG. 7 is a side partial cross-sectional view of the flexible coupling used to form the expansion installation of the invention.

The expansion joint or coupling is designated generally as 127 in FIG. 7. The coupling 127 would typically be used in a coaxially aligned piping system where the lengths encounter an angular fitting such as the elbow 15 (FIG. 2). However, for purposes of the present invention, the coupling 127 may also be employed in a straight run of pipe, where the release agent has been installed to provide controlled failure adjacent that point. The coupling 127 is particularly advantageous in countering the harmful effects of coaxial stresses which are often encountered in a "high temperature" insulated piping system, however. The term "high temperature" is intended to encompass any temperature above ambient which would tend to cause the type of damage to the surrounding insulating layers of the piping system discussed with respect to FIGS. 1–3 above. Typically, such temperatures will be above about 200° F., often above 250° F., and in some cases temperatures of 400° and higher will be encountered.

The flexible coupling 127 of the invention includes a first length 131 and a second length 133 (both shown broken away in FIG. 7) of insulated and jacketed pipe. Each of the lengths 131, 133 has a joining end 135 to be joined to a similar end 137 of the other length. Each pipe length comprises an inner pipe 139, 141, an envelope of foamed insulation 143, 145 surrounding the inner pipe and an outer protective jacket 147, 149 surrounding the envelope of insulation. The first and second pipe lengths 131, 133 can be standard factory type product of the kind described above and available from Thermacor Process, LP of Fort Worth, Tex., except that at least selected lengths of the inner metal pipes are coated with the special release agent, as previously described.

As shown in FIG. 7, each innerpipe 139, 141 projects beyond the end of the envelope of insulation and beyond an end of the jacket to form initially exposed joining ends 135, 137. The joining ends 135, 137 of steel pipe will typically be welded together (illustrated by the vertical line in FIG. 7) in order to form a continuous fluid conduit for conveying high temperature fluids.

In the particular embodiment of the invention illustrated in FIG. 7, the surrounding foam insulation layers 143, 145 are typically polyurethane closed cell foam insulation for systems of up to about 250° F. and polyisocyanurate foam insulation for systems above 250° F. The surrounding jacket 147, 149 is a polyolefin, preferably HDPE.

Figure 8:
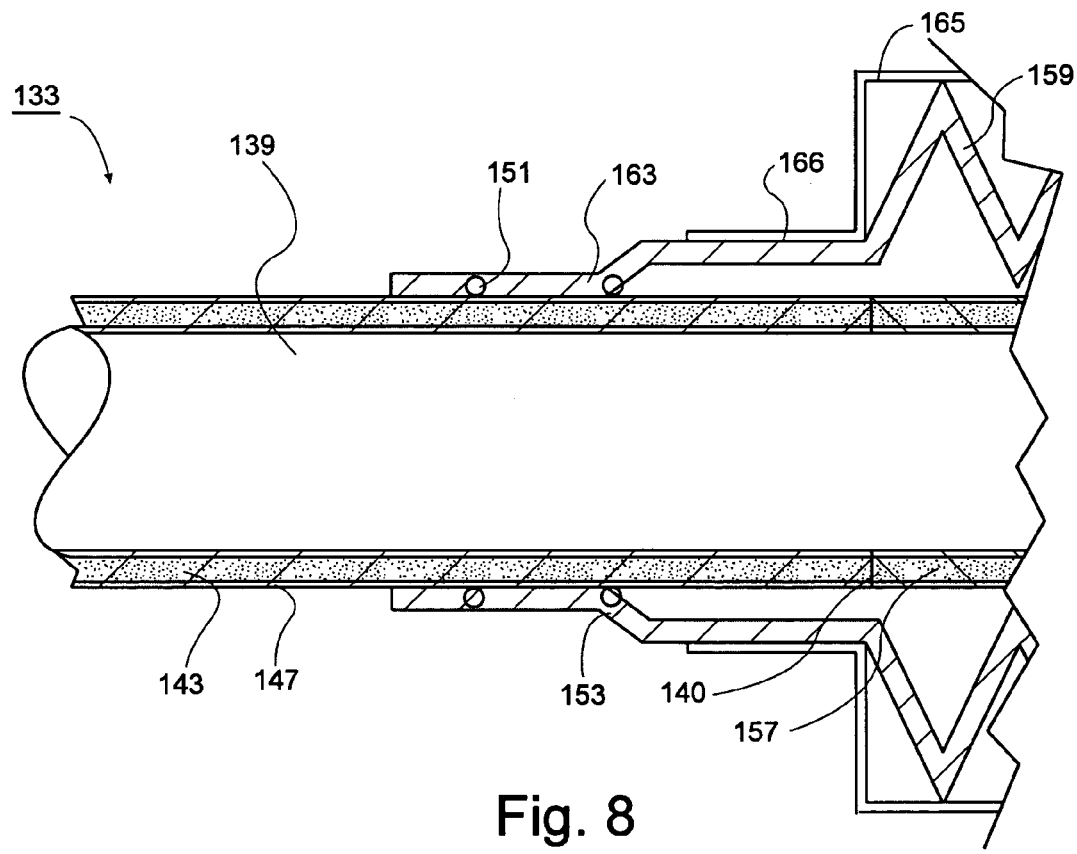
FIG. 8 is a close-up view of a portion of the flexible coupling of FIG. 7.
Figure 9A:
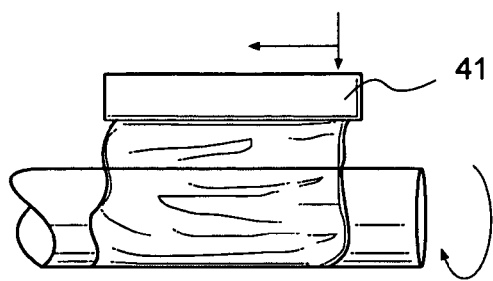
FIGS. 9A and 9B are simplified, side views of the first step of the method of the invention in which a special release agent is applied to the exterior surface of the inner metal pipe.
Figure 9B:
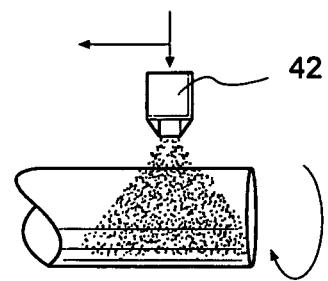

As shown in FIGS. 7 and 8, a layer of high temperature insulation 157 preferably surrounds the joining ends 135, 137 of the inner pipes 139, 141 and extends between the outer points 140, 142, respectively. The layer 157 can comprise a polyurethane foam for systems under 250° F. or a polyisocyanate foam for systems above 250° F. In some cases, it is possible to place a hollow jacket about the pipe joining ends 135, 137 with a two part commercially available mix being added through a hole in the jacket and allowed to cure. However, in the preferred method of forming the piping installation of the invention, the insulating layer for the joining ends of the pipe is preformed at the factory and provided as two side half cuts which are placed about the pipe joining ends to form a concentric cylinder. Each half cut is formed from a "crushable" foam so that the foam will be crushed or broken up upon relative movement of the inner pipes 139, 141. Note also that the crushable foam layer 157 is not joined to the exposed joining ends of the inner pipes or to the protective jackets, allowing its movement relative to these other components of the piping installation.

A tubular bellows 159 (FIGS. 4 and 5) which can also be formed of HDPE surrounds the joining ends of the inner pipes. The bellows is capable of axially expanded and contracted and of being configured in a straight or axial configuration. The tubular bellows has opposing outer extents 161, 163 (FIGS. 7 and 8) which are joined to the prospective protective jackets of the respective pipe lengths being coupled. For example, the outer extent 163 is joined to the jacket 147 of the pipe end 133 in FIG. 8. This can be accomplished in a number of ways. For example, a commercially available POWERCORE® welding wire (illustrated in simplified fashion as 151, 153 in FIG. 8) can be used to electrofuse and join the opposite extents of the tubular bellows 159 and the outer exposed surface of the HDPE jacket. The outer extent 163 of the bellows surrounds the jacket 147 and resistive wires 151, 153. Upon applying an electric current to the wires, a weld between the bellows and jacket is achieved. The entire bellows assembly can be covered with a protective shield, if desired. The shield (165 in FIG. 7) could be formed of lightweight metal or from a suitable thermoplastic. In the preferred embodiment illustrated in FIGS. 7 and 8, a polyethylene shield 165 has flanges 166 which are received upon the outer extents of the bellows. If desired, a suitable resistive wire arrangement can be used to simultaneously electrofuse the bellows and shield, since both the bellows and shield can be formed of a HDPE type material.

Figure 6:
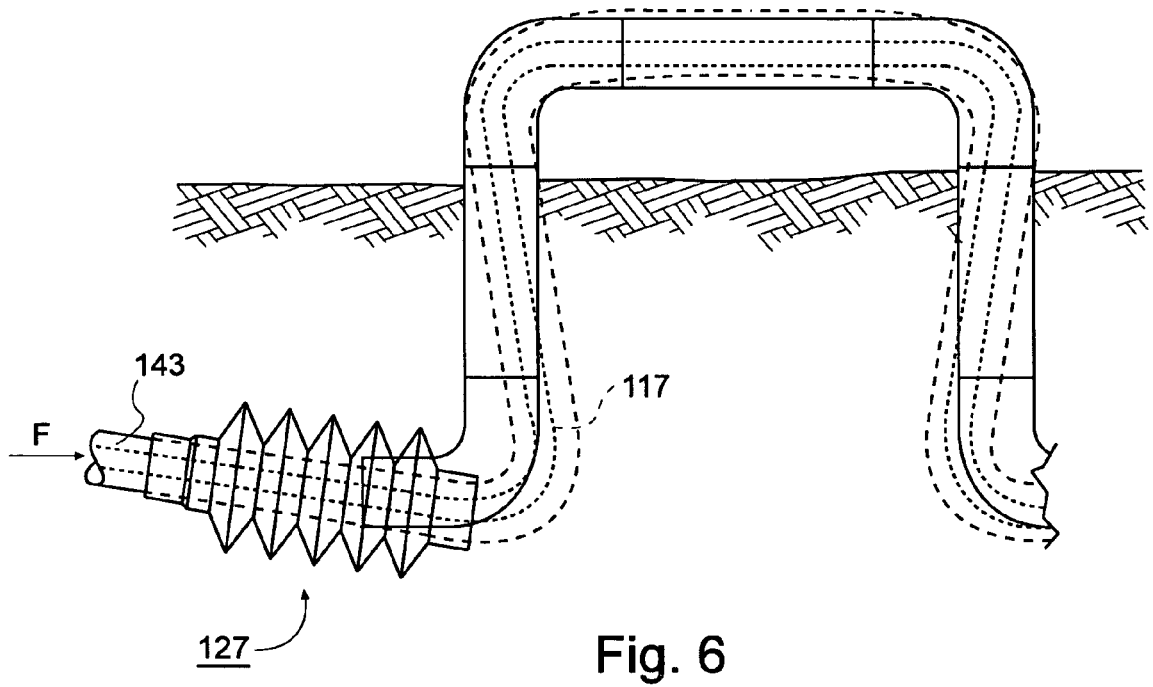
FIG. 6 is a simplified view of the flexible coupling of the invention showing its relative movement during expansion and contraction of the pipeline.

FIG. 6 illustrates the insulated piping installation of the invention with the flexible coupling 127 in place. In FIG. 6, the protective sleeve or shield 165 is not shown in order to better illustrate the action of the bellows 159. The force F, tends to cause the inner steel pipe 117 to assume the path illustrated by the dotted lines in FIG. 6. Because the bellows 159 can expand and contract, however, outer jacket remains intact and the integrity of the foam insulations (143 in FIGS. 6 and 7) is not disrupted. Because the insulating layer 143 remains intact, water or other contaminants are prevented from reaching the inner steel pipe 117, thereby extending the useful life of the pipeline.

An invention has been provided with several advantages. The pre-insulated piping systems of the invention can normally be designed so that disbondment of the foam does not occur, as through the selection of appropriate materials for the inner insulating foam layer and the outer jacket. In those situations in which excessive environmental stress is encountered, such as elevated temperatures, the special release agent causes a designed failure in the system at preselected locations along the pipeline. A mechanical expansion joint, or other compensating mechanism, can be placed at an appropriate location to alleviate problems previously encountered with high temperature piping systems where elbows, other angled fittings, and other pipe locations were subjected to damaging stresses. The system incorporates several existing, commercially available materials or components, thereby simplifying manufacture and assembly. The release agent can be easily applied as one step in the already existing manufacturing process and adds little expense to the overall operation. The particular bellows and additional flexible coupling components of the system compensate for relative movement of the inner steel pipe. The coupling is simple in design and economical to implement in a variety of industrial applications.

While the invention has been shown in one of its forms, it is not thus limited but is susceptible to various changes and modifications without departing from the spirit thereof.

What is claimed is:

1. An insulated piping system for conveying high temperature fluids, comprising:
   a first and second length of insulated and jacketed pipe, each having a joining end to be joined to an end of the other length, each pipe length comprising an inner carrier pipe having an interior surface and an exterior surface, an envelope of foamed insulation surrounding the innerpipe exterior surface, and an outer protective jacket surrounding the envelope of insulation, the joining ends of adjacent pipe lengths being welded together to form fixed joints, whereby the adjacent pipe lengths provide a continuous fluid conduit for conveying high temperature fluids;
   wherein a special release agent is applied to at least selected locations on the exterior surface of the inner carrier pipes and wherein the envelope of foamed insulation is then applied over the release agent, the release agent being selected to intentionally fail at conditions of predetermined environmental stress, so that the disbondment of the surrounding envelope of insulation from the inner carrier pipes occurs in a predictable, uniform fashion rather than in a haphazard fashion.

2. The insulated piping system of claim 1, further comprising:
   a flexible tubular bellows surrounding the joining ends of the inner pipes, the bellows being capable of being axially expanded and contracted and of being configured in a straight or curved axial configuration, the tubular bellows having opposing outer extents which are joined to the respective protective jackets of the respective pipe lengths being coupled thereby.

3. The insulated piping system of claim 1, wherein the foam insulation is selected from the group consisting of polyurethane foams and high temperature polyisocyanurate foams.

4. The insulated piping system of claim 1, wherein the protective jackets are formed from a synthetic polyolefin.

5. The insulated piping system of claim 1, wherein the inner carrier pipe is a steel pipe.

6. The insulated piping system of claim 1, wherein the release agent initially bonds to both the exterior surface of the inner carrier pipes and to the surrounding foamed insulation at an interface layer.

7. The insulated piping system of claim 1, wherein the release agent is a material which does not bond to the exterior surface of the inner carrier pipes.

8. The insulated piping system of claim 1, wherein the lengths of insulated piping are part of a pipeline conveying steam, hot water or other hot fluids at a temperature above about 250° F.

9. The insulated piping system of claim 1, wherein the release agent is selected from the group consisting of polyolefin sprays and wraps.

10. The insulated piping system of claim 1, wherein the release agent is selected from the group consisting of polytetrafluoroethylene and other non-stick materials.

11. The insulated piping system of claim 1, wherein the release agent forms a layer of a predetermined thickness on the exterior surface of the inner carrier pipes, the thickness being in the range from about 2–50 mils.

12. A method of controlling the disbondment of a surrounding foam insulating layer in a pre-insulated piping system, the method comprising the steps of:
   providing a first and second length of insulated and jacketed pipe, each having a joining end to be joined to an end of the other length, each pipe length comprising an inner metal pipe having an interior surface and an exterior surface;
   applying a layer of a special release agent onto at least selected regions of the exterior surface of the inner metal pipes;

applying an envelope of foamed insulation which surrounds the inner pipes exterior surface and envelopes the inner pipes;

applying an outer protective jacket which surrounds the envelope of insulation, the joining ends of adjacent pipe lengths being welded together to form fixed joints, whereby the adjacent pipe lengths provide a continuous fluid conduit for conveying high temperature fluids;

wherein the special release agent is selected to intentionally fail at conditions of predetermined environmental stress, so that the disbondment of the surrounding envelope of insulation from the inner metal pipes occurs in a predictable, uniform fashion rather than in a haphazard fashion.

13. The method of claim 12, further comprising the steps of:

installing an expansion compensating mechanism adjacent the region of the inner pipes where the release agent was applied to accommodate movement of the envelope of formed insulation and of the inner metal pipes.

14. The method of claim 12, further comprising the steps of:

installing a flexible tubular bellows surrounding the joining ends of the inner pipes, the bellows being capable of being axially expanded and contracted and of being configured in a straight or curved axial configuration, the tubular bellows having opposing outer extents which are joined to the respective protective jackets of the respective pipe lengths being coupled thereby.

15. The method of claim 12, wherein the foam insulation which is used to surround the inner pipes is a high temperature polyisocyanurate foam.

16. The method of claim 12, wherein the protective jackets are formed of HDPE.

17. The method of claim 11, wherein the lengths of insulated piping are part of a pipeline conveying steam at a temperature above about 250° F.

* * * * *